United States Patent
Yu et al.

(10) Patent No.: US 10,177,377 B2
(45) Date of Patent: Jan. 8, 2019

(54) POSITIVE ACTIVE MATERIAL FOR RECHARGEABLE LITHIUM BATTERY, METHOD OF PREPARING SAME AND RECHARGEABLE LITHIUM BATTERY INCLUDING SAME

(75) Inventors: Dong-Hwan Yu, Yongin-si (KR); Gun-Ho Kwak, Yongin-si (KR); Sung-Hoon Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 1049 days.

(21) Appl. No.: 13/398,957

(22) Filed: Feb. 17, 2012

(65) Prior Publication Data
US 2012/0258366 A1    Oct. 11, 2012

(30) Foreign Application Priority Data
Apr. 8, 2011    (KR) ........................ 10-2011-0032822

(51) Int. Cl.
| | |
|---|---|
| H01M 4/505 | (2010.01) |
| H01M 4/525 | (2010.01) |
| C01G 51/00 | (2006.01) |
| C01G 53/00 | (2006.01) |
| H01M 4/131 | (2010.01) |
| H01M 10/0525 | (2010.01) |
| H01M 4/02 | (2006.01) |

(52) U.S. Cl.
CPC ............ *H01M 4/525* (2013.01); *C01G 51/50* (2013.01); *C01G 53/50* (2013.01); *H01M 4/505* (2013.01); *C01P 2002/52* (2013.01); *C01P 2004/61* (2013.01); *C01P 2004/84* (2013.01); *C01P 2006/12* (2013.01); *C01P 2006/40* (2013.01); *H01M 4/131* (2013.01); *H01M 10/0525* (2013.01); *H01M 2004/021* (2013.01); *Y10T 428/2982* (2015.01)

(58) Field of Classification Search
USPC ....................... 429/208–246; 29/623.1–623.5
See application file for complete search history.

(56) References Cited

U.S. PATENT DOCUMENTS

| | | | |
|---|---|---|---|
| 6,383,235 B1 | 5/2002 | Maegawa et al. | |
| 2001/0031397 A1* | 10/2001 | Kweon et al. ............. | 429/218.1 |

(Continued)

FOREIGN PATENT DOCUMENTS

| | | |
|---|---|---|
| JP | 2009-004386 A | 1/2009 |
| KR | 1999-0087108 | 12/1999 |

(Continued)

*Primary Examiner* — Jonathan Crepeau
(74) *Attorney, Agent, or Firm* — Lee & Morse, P.C.

(57) ABSTRACT

A positive active material for a rechargeable lithium battery is a secondary particle formed of an assembly of primary particles of a nickel-based compound. The positive active material has an average particle diameter ranging from 5.5 μm to 7.5 μm and a specific surface area ranging from 0.40 m²/g to 2.0 m²/g. When the positive active material has an average particle diameter ranging from 11 μm to 13 μm, the positive active material has a specific surface area ranging from 0.15 m²/g to 1.0 m²/g. A rechargeable lithium battery includes the positive active material.

13 Claims, 2 Drawing Sheets

(56) References Cited

U.S. PATENT DOCUMENTS

2004/0058244 A1* 3/2004 Hosoya et al. ............ 429/231.1
2012/0231343 A1* 9/2012 Nagase ................. H01M 4/505
                                                                  429/231.1

FOREIGN PATENT DOCUMENTS

WO    WO 2008/084679 A1    7/2008
WO    WO 2011077932    *  6/2011

* cited by examiner

POSITIVE ACTIVE MATERIAL FOR RECHARGEABLE LITHIUM BATTERY, METHOD OF PREPARING SAME AND RECHARGEABLE LITHIUM BATTERY INCLUDING SAME

BACKGROUND

1. Field

This disclosure relates to relates to a positive active material for a rechargeable lithium battery, a method of preparing the same, and a rechargeable lithium battery including the same.

2. Description of the Related Art

In recent times, due to reductions in size and weight of portable electronic equipment, there has been a need to develop batteries for the portable electronic equipment that have both high performance and large capacity.

As for negative active materials of a rechargeable lithium battery, various carbon-based materials such as artificial graphite, natural graphite, and hard carbon, which can all intercalate and deintercalate lithium ions, have been used.

SUMMARY

According to an embodiment, there is provided a positive active material for a rechargeable lithium battery, the positive active material including secondary particles including agglomerated primary particles of a nickel-based compound, and having a specific surface area ranging from 0.4 m²/g to 2.0 m²/g when the positive active material has an average particle diameter ranging from 5.5 μm to 7.5 μm, and a specific surface area ranging from 0.15 m²/g to 1.0 m²/g when the positive active material has an average particle diameter ranging from 11 μm to 13 μm.

The nickel-based compound may be represented by the following Chemical Formula 1 or 2:

$Li_xMO_{2-z}L_z$ [Chemical Formula 1]

wherein, M is $M'_{1-k}A_k$ (M' is $Ni_{1-d-e}Mn_dCo_e$, 0.3≤d+e≤0.7, 0.1≤e≤0.4, A is a dopant, and 0≤k<0.05);

L is F, S, P, or a combination thereof, 0.95≤x≤1.05, and

0≤z≤2, $Li_xNi_yT_{1-y}O_{2-z}L_z$ [Chemical Formula 2]

wherein, T is Al, Ni, Co, Mn, Cr, Fe, Mg, Sr, a rare earth element, or a combination thereof, L is F, S, P, or a combination thereof, 0.95≤x≤1.05, 0.3≤y≤0.7, and 0≤z≤2.

The primary particles may have an average particle diameter ranging from 0.1 μm to 2.0 μm when the positive active material has an average particle diameter ranging from 5.5 μm to 7.5 μm, and the primary particles have an average particle diameter ranging from 0.1 μm to 4.0 μm when the positive active material has an average particle diameter ranging from 11 μm to 13 μm.

A pore channel may be between the primary particles.

A metal oxide layer may be on at least one surface of the primary particles and the secondary particles.

The metal oxide layer may include a metal that is Mg, Al, Co, K, Na, Ca, Si, Ti, V, Sn, Ge, Ga, B, As, Zr, or a mixture thereof.

The metal oxide layer may have a thickness ranging from 1 nm to 50 nm.

According to an embodiment, there is provided a method of preparing a positive active material for a rechargeable lithium battery, the method including preparing a transition element composite precursor by agitating and reacting a metal-mixed liquid including a nickel compound, a cobalt compound, and a manganese compound, spray-drying the transition element composite precursor under a pressure greater than 0.5 MPa and less than or equal to 1.0 MPa to prepare a porous transition element composite precursor, mixing the porous transition element composite precursor with a lithium salt, and heat-treating the mixture.

The method may further include coating the transition element composite precursor with a metal oxide to form a metal oxide layer thereon.

The coating of the transition element composite precursor with a metal oxide to form the metal oxide layer thereon may be carried out after the heat treatment.

The spray-drying process may be performed at a temperature ranging from 150° C. to 250° C.

The heat treatment may be performed at a temperature ranging from 750° C. to 990° C.

According to an embodiment, there is provided a rechargeable lithium battery, including a positive electrode including the positive active material, a negative electrode comprising a negative active material, and an electrolyte.

According to an embodiment, there is provided a positive active material for a rechargeable lithium battery, the positive active material including secondary particles including agglomerated primary particles of a nickel-based compound, the positive active material having a specific surface area ranging from 0.4 m²/g to 2.0 m²/g and an average a particle diameter ranging from 5.5 μm to 7.5 μm.

The nickel-based compound may be represented by the following Chemical Formula 1 or 2:

$Li_xMO_{2-z}L_z$ [Chemical Formula 1]

wherein, M is $M'_{1-k}A_k$ (M' is $Ni_{1-d-e}Mn_dCo_e$, 0.3≤d+e≤0.7, 0.1≤e≤0.4, A is a dopant, and 0≤k<0.05);

L is F, S, P, or a combination thereof, 0.95≤x≤1.05, and

0≤z≤2, $Li_xNi_yT_{1-y}O_{2-z}L_z$ [Chemical Formula 2]

wherein, T is Al, Ni, Co, Mn, Cr, Fe, Mg, Sr, a rare earth element, or a combination thereof, L is F, S, P, or a combination thereof, 0.95≤x≤1.05, 0.3≤y≤0.7, and 0≤z≤2.

A pore channel may be between the primary particles.

A metal oxide layer may be on at least one surface of the primary particles and the secondary particles.

The metal oxide layer may include a metal of Mg, Al, Co, K, Na, Ca, Si, Ti, V, Sn, Ge, Ga, B, As, Zr, or a mixture thereof.

The metal oxide layer may have a thickness ranging from 1 nm to 50 nm.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Figure 1:
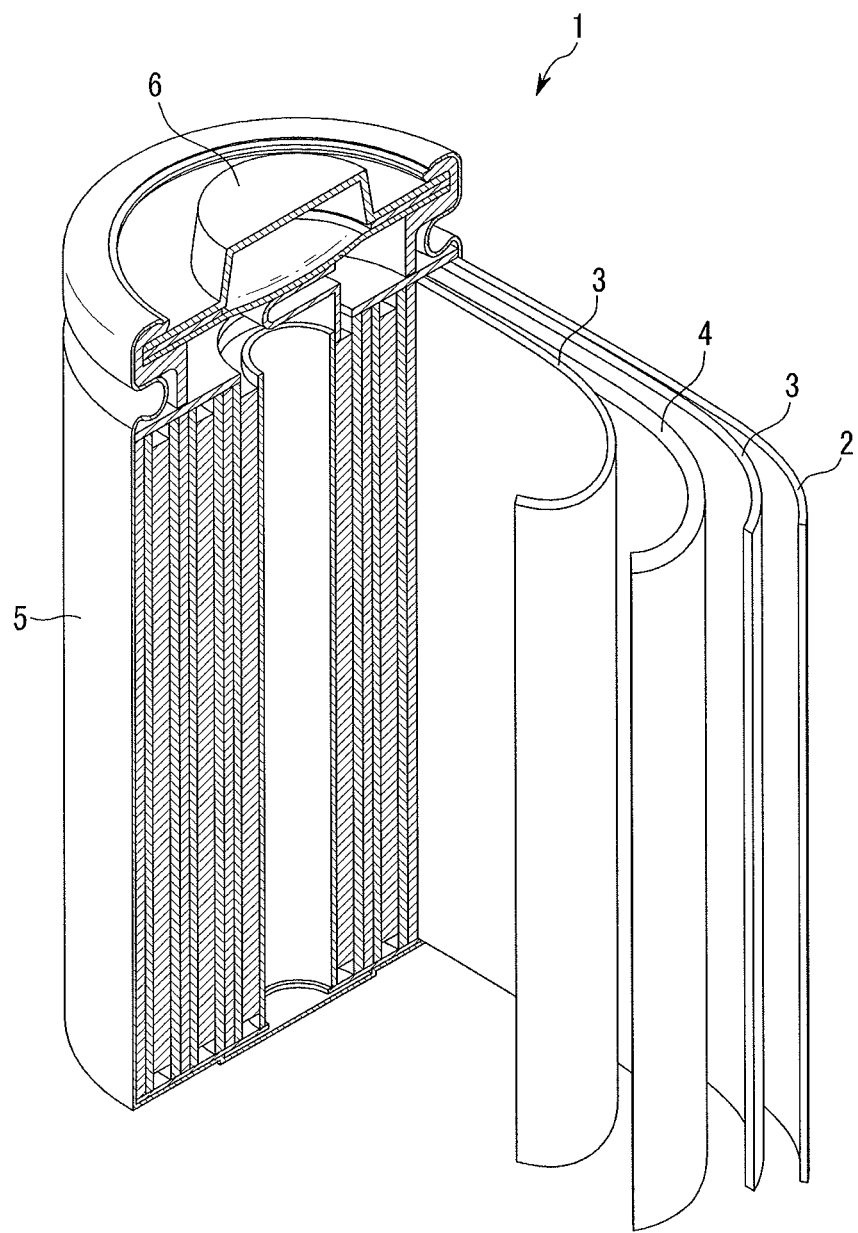
FIG. 1 illustrates a schematic view of a rechargeable lithium battery according to one embodiment.

Korean Patent Application No. 10-2011-0032822, filed on Apr. 8, 2011, in the Korean Intellectual Property Office, and entitled: "Positive Active Material for Rechargeable Lithium Battery, Method of Preparing Same and Rechargeable Lithium Battery Including Same," is incorporated by reference herein in its entirety.

Exemplary embodiments of the present disclosure will hereinafter be described in detail. However, these embodiments are only exemplary, and this disclosure is not limited thereto.

One embodiment a provides positive active material for a rechargeable lithium battery, which includes a secondary particles of agglomerated primary particles of a nickel-rich based compound One embodiment, a positive active material may have an average particle diameter and a specific surface area that are regulated in their relationship. When the positive active material has an average particle diameter ranging from 5.5 μm to 7.5 μm, the positive active material may have a specific surface area ranging from 0.40 m²/g to 2.0 m²/g, or, in another embodiment, equal to or greater than 0.40 m²/g and less than 2.0 m²/g. Furthermore, when the positive active material has an average particle diameter ranging from 11 μm to 13 μm, the positive active material may have a specific surface area ranging from 0.15 m²/g to 1.0 m²/g. In addition, when the positive active material has an average particle diameter ranging greater than 7.5 μm and less than 11 μm, the positive active material may have a specific surface area ranging from 0.25 m²/g to 1.5 m²/g. The average particle diameter and specific surface area of the positive active material indicate that the positive active material is porous.

When a positive active material has a specific surface area within the range depending on an average particle diameter, the positive active material may have improved capacity and power characteristics. When a positive active material has a smaller specific surface area than the range depending on its average particle diameter, the positive active material may have increased resistance. When a positive active material has bigger specific surface area than the range depending on its average particle diameter, the positive active material may be broken, making it difficult to produce, and have a safety problem and increased resistance.

In this specification, the term "average particle diameter" refers to a D50 value, which indicates a particle size when an active material particle with various particle sizes of 0.1, 0.2, 0.3 . . . 3, 5, 7 . . . 10, 20, 30 μm, etc., is accumulated up to about 50%.

In one embodiment, the nickel-based compound may be a compound represented by the following Chemical Formula 1 or 2.

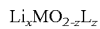  $Li_xMO_{2-z}L_z$ [Chemical Formula 1]

In Chemical Formula 1, M is M'$_{1-k}$A$_k$, M' is Ni$_{1-d-e}$Mn$_d$Co$_e$, 0.3≤d+e≤0.7, 0.1≤e≤0.4, A is a dopant, and 0≤k<0.05. Herein, A may be selected from B, Ca, Zr, S, F, P, Bi, Al, Mg, Zn, Sr, Cu, Fe, Ga, In, Cr, Ge or Sn.

L is F, S, P, or a combination thereof, 0.95≤x≤1.05, and 0≤z≤2.

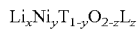 $Li_xNi_yT_{1-y}O_{2-z}L_z$ [Chemical Formula 2]

In Chemical Formula 2, T is Al, Ni, Co, Mn, Cr, Fe, Mg, Sr, a rare earth element, or a combination thereof, L is F, S, P, or a combination thereof, 0.95≤x≤1.05, 0.3≤y≤0.7, and 0≤z≤2.

When the positive active material has an average particle diameter ranging from 5.5 μm to 7.5 μm, the primary particles may have an average particle diameter ranging from 0.1 μm to 2.0 μm. When the positive active material has an average particle diameter ranging from 11 μm to 13 μm, the primary particles may have an average particle diameter ranging from 0.1 μm to 4.0 μm. When primary particles have an average particle diameter within these ranges, power may be improved and the positive active material may be usefully applied to a high power battery.

According to one embodiment, a pore channel may be formed between the primary particles in the positive active material. The pore channel increases a reaction area with an electrolyte and decreases resistance, resulting in improved capacity and power characteristics.

In a positive active material according to one embodiment, a metal oxide layer may be formed on both surfaces of the primary particles and secondary particles.

According to one embodiment, the metal oxide layer may include a metal such as Mg, Al, Co, K, Na, Ca, Si, Ti, V, Sn, Ge, Ga, B, As, Zr, or a mixture thereof. In addition, the metal oxide layer may have a thickness ranging from 1 nm to 50 nm. When a metal oxide layer has a thickness within the range, the metal oxide layer may have appropriate effects, avoiding a reduction in lithium mobility and improving conductivity.

According to one embodiment, the resistance of the positive active material may be small, and thus, the positive active material may be applied to a high power battery.

The positive active material according to one embodiment may be prepared according to the following process.

1) Preparation of a Porous Composite Precursor

A nickel compound, a cobalt compound, and a manganese compound are added to a solvent to prepare a metal-mixed liquid.

The nickel compound, cobalt compound, and manganese compound may include any metal compound generally used in a process of preparing a composite precursor. Examples of the nickel compound, cobalt compound, and manganese compound may include a sulfate, a hydrochloride, an acetate, a carbonate, a phosphonate, or a fluoride, including the nickel, cobalt, or manganese, or a combination thereof.

The solvent may include an organic solvent, such as ethanol, methanol, or a combination thereof, water, or a combination of the organic solvent and water.

The nickel compound, cobalt compound, and manganese compound are mixed in an appropriate ratio depending the desired composition of the product. A total metal concentration of nickel, cobalt and manganese may be from 1M to 10M in a metal-mixed liquid. When the metal compounds are included within this metal concentration range, the metals may have an appropriate co-precipitation reaction but not produce a non-reacted compound.

The metal mixture is adjusted to have pH ranging from 7.0 to 11.5 or, as a non-limiting example, from 7 to 10. When the metal mixture has pH within the above range, sheet-shaped particles may not be produced. Accordingly, a spherical active material may be prepared to an appropriate size. The pH may be regulated by using alkali such as sodium hydroxide, ammonia, and the like.

Then, while the metal-mixed liquid is agitated, the metal mixture may be maintained at a temperature ranging from 40° C. to 80° C. for 3 to 10 hours or, as a non-limiting example, for 4 to 7 hours. Herein, the metal-mixed liquid undergoes a precipitation reaction, producing a transition elements composite precursor. The agitation may be performed at a speed ranging from 700 rpm to 900 rpm. When the agitation is performed within this speed range, the transition element composite precursor may be prepared to have an appropriate particle size.

The transition element composite precursor is obtained by a cleaning process of filtration and washing.

The transition element composite precursor is spray-dried to prepare a porous precursor. The spray-drying may be performed at a temperature ranging from 150° to 250° C. or, as a non-limiting example, from 170° C. to 230° C. When the spray-drying is performed within this temperature range, sufficient drying occurs, without leaving or absorbing water of crystallization, and, thus, the conversion of the transition element composite precursor to an oxide with high hygroscopicity by thermally decomposing does not occur Accordingly, a porous precursor may be produced at a high yield and may be easily handled.

In addition, the spray-drying may be performed under a pressure between 0.5 MPa and 1.0 MPa, or, as a non-limiting example, greater than 0.5 MPa and less than 0.9 MPa. When the spray-drying is performed under a pressure of 0.5 MPa or less, a droplet with an appropriate size may not be produced. However, when the spray-drying is performed under a pressure of more than 1.0 MPa, a droplet may be too small to be sufficiently dried.

The spray-drying process may be performed under an inert atmosphere to prevent oxidation, for example, under nitrogen or argon atmosphere or a combination thereof.

When the spray-drying process is performed at the temperature under the pressure, a spherical precursor with an average particle diameter ranging from 4.5 μm to 12 μm may be prepared.

The spray-drying may be performed under various conditions to control the size and shape of the precursor and accordingly, control the size and shape of the final active material, which depends on the size and shape of the precursor.

2) Surface Treatment of a Metal Oxide

A surface treatment may be performed to form a metal oxide layer. However, this process may be omitted when a metal oxide layer is not formed. The porous precursor may be coated with a metal oxide to form a metal oxide layer on the surface.

The coating process may be performed using a dry method or a wet method. The dry coating may include sputtering, CVD, and the like. The wet coating may include dip coating, spray coating, and the like.

The wet coating may include using ethanol, methanol, or a combination thereof as a solvent. In addition, the solvent may be controlled regarding concentration during the wet process.

The metal oxide may include Mg, Al, Co, K, Na, Ca, Si, Ti, V, Sn, Ge, Ga, B, As, Zr, or a mixture thereof. The metal oxide may be controlled regarding an average particle diameter.

The metal oxide may be included but in an amount of 0.1 mol % to 10 mol % or, as a non-limiting example, from 0.1 mol % to 5 mol % based on the total weight of a porous precursor. In determining the amount of metal oxide to be included, the amount of a metal-containing lithium compound included in a metal oxide additionally included in the next step may be taken into consideration. When a metal oxide is coated within the range given above, the metal oxide may be uniformly coated on the surface of the porous precursor without capacity deterioration.

The process may provide a metal oxide layer with a thickness ranging from 1 nm to 50 nm.

3) Preparation of a Compound of Chemical Formula 1

A porous precursor with or without a metal oxide layer is mixed with a lithium salt. Herein, a metal-containing lithium compound included in the metal oxide layer may further include, for example, $Li_4Ti_5O_{12}$ and the like but is not limited thereto.

The lithium salt may include at least one of lithium carbonate, lithium nitrate, lithium acetate, lithium hydroxide, lithium hydroxide hydrate, lithium oxide, or the like. Among these, lithium carbonate is particularly easy to handle, is stable in the air, and has a low cost.

The mixing may be performed using a dry method or a wet method. The wet method may use a solvent such as water, ethanol, methanol or combination thereof.

The mixing process may be performed in a desired ratio among a porous precursor, a lithium salt, and selectively, a lithium compound depending on a desired composition of a desired compound.

Then, the mixture is heat-treated. The heat treatment may be performed at a temperature ranging from 750° C. to 990° C. of, as a non-limiting example, from 800° C. to 950° C. The heat treatment may be performed by increasing a temperature at a rate of 0.1° C./min to 10° C./min up to a temperature ranging from 750° C. to 990° C. or, as a non-limiting example, 800° C. to 950° C. When the heat treatment is performed within this rate range, a product may have very excellent properties.

When the heat treatment is performed within the temperature range, a compound with an appropriate crystalline may be prepared, controlling its particle size. In addition, the heat treatment may not damage on the heat treatment equipment.

In addition, when the heat treatment is performed for 10 hours or more, an active material with desired properties may be prepared. Accordingly, there is no time limit to the maximum time of the heat treatment.

This process may uniformly disperse an additional element into a positive active material and thus, secure structural stability and electrochemical excellence of the positive active material. In addition, the process may provide a compound represented by the above Chemical Formula 1 of secondary particles made up of agglomerated primary particles and forming a positive active material. The primary particles and secondary particles may include a metal oxide layer on the surfaces.

According to yet another embodiment, a rechargeable lithium battery includes a positive electrode including the positive active material, a negative electrode including a negative active material, and an electrolyte.

The positive electrode includes a current collector and a positive active material layer disposed on the current collector. The positive active material may be the positive active material according to one embodiment.

The positive active material layer may include 80 wt % to 98 wt % of a positive active material based on the total weight of the positive active material layer.

The positive active material layer may also include a binder and a conductive material. The binder and conductive material may be included in amounts of 1 wt % to 10 wt % based on the total weight of the positive active material layer, respectively.

The binder improves binding properties of the positive active material particles among one another and also with a current collector. Examples of the binder include polyvinyl alcohol, carboxylmethyl cellulose, hydroxypropyl cellulose, diacetyl cellulose, polyvinyl chloride, carboxylated polyvinyl chloride, polyvinylfluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. The conductive material may include any electrically conductive material that does not cause a chemical change. Examples of the conductive material include carbon-based materials such as natural graphite, artificial graphite, carbon black, acetylene black, ketjen black, carbon fiber, and the like; metal-based materials such as a metal powder, a metal fiber, or the like, including copper, nickel, aluminum, silver, and the like; a conductive polymer such as a polyphenylene derivative; or a mixture thereof.

The current collector may be aluminum (Al), but is not limited thereto.

The negative electrode includes a current collector and a negative active material layer disposed on the current collector. The negative active material layer includes a negative active material.

The negative active material includes a material that reversibly intercalates/deintercalates lithium ions, a lithium metal, a lithium metal alloy, a material being capable of doping/dedoping lithium, or a transition metal oxide.

The material that may reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, mesophase pitch carbonized products, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), a Si-Q alloy (where Q is an element selected from an alkali metal, an alkali-earth metal, a group 13 element, a group 14 element, a group 15 element, a group 16 element, a transition element, a rare earth element, and combinations thereof, and is not Si), Sn, $SnO_2$, a Sn—R alloy (where R is an element selected from an alkali metal, an alkali-earth metal, a group 13 element, a group 14 element, a group 15 element, a group 16 element, a transition element, a rare earth element, and combinations thereof, and is not Sn), and mixtures thereof. At least one of these materials may be mixed with $SiO_2$. The elements Q and R are independently selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, or lithium titanium oxide represented by the following Chemical Formula 3.

$$Li_{x3}Ti_{y3-z3}M''_{z3}O_{4-z4}$$ [Chemical Formula 3]

wherein 0.6≤x3≤2.5, 1.2≤y3≤2.3, 0≤z3≤0.5, 0≤z4≤0.5, M" is V, Cr, Nb, Fe, Ni, Co, Mn, W, Al, Ga, or a combination thereof.

The negative active material layer may include 95 wt % to 99 wt % of a negative active material based on the total weight of the negative active material layer.

The negative active material layer may include a binder and optionally a conductive material. The binder may be included in an amount ranging from 1 wt % to 5 wt % based on the total weight of the negative active material layer. In addition, when the negative active material layer further includes a conductive material, it may include 90 wt % to 98 wt % of the negative active material, 1 wt % to 5 wt % of the binder, and 1 wt % to 5 wt % of the conductive material.

The binder improves binding properties of negative active material particles among one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, polyvinyl alcohol, sodium polyacrylate, a copolymer of propylene and C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound may include one or more of carboxylmethyl cellulose, hydroxypropylmethyl cellulose, methyl cellulose, or alkali metal salts thereof. The alkali metal may be sodium (Na), potassium (K), or lithium (Li). The cellulose-based compound may be included in an amount ranging from 0.1 to 3 parts by weight based on 100 parts by weight of the negative active material.

The conductive material may be included to improve electrode conductivity. The conductive material may include any electrically conductive material that does not cause a chemical change. Examples of the conductive material include carbon-based materials such as natural graphite, artificial graphite, carbon black, acetylene black, ketjen black, carbon fiber, and the like; metal-based materials such as a metal powder, a metal fiber, or the like including copper, nickel, aluminum, silver, and the like; a conductive polymer such as a polyphenylene derivative; or a mixture thereof.

The current collector may be selected from a copper foil, a nickel foil, a stainless steel foil, a titanium foil, a nickel foam, a copper foam, a polymer substrate coated with a conductive metal, and combinations thereof.

The negative and positive electrodes may be fabricated in a method of mixing an active material, a conductive material, and a binder into an active material composition and coating the composition on a current collector. The solvent may include N-methylpyrrolidone and the like, but is not limited thereto. In addition, when the binder in a negative electrode is a water-soluble binder, water may be used for a solvent during preparation of a negative active material composition.

In the rechargeable lithium battery according to one embodiment, the electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon group, or includes a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent may be prepared by mixing a cyclic carbonate and a linear carbonate. The cyclic carbonate and the linear carbonate are mixed together in the volume ratio ranging from 1:1 to 1:9. When the mixture is used as an electrolyte, the electrolyte performance may be enhanced.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from 1:1 to 30:1.

The aromatic hydrocarbon-based organic solvent may be represented by the following Chemical Formula 4.

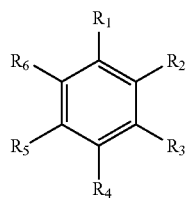

[Chemical Formula 4]

In Chemical Formula 4, $R_1$ to $R_6$ may be the same or different, and are selected from hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate, an ethylene carbonate-based compound represented by the following Chemical Formula 5, or a combination thereof to improve cycle-life as an additive.

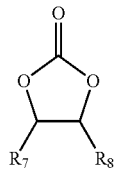

[Chemical Formula 5]

In Chemical Formula 5, $R_7$ and $R_8$ are the same or different and are selected from the group of hydrogen, a halogen cyano group (CN), a nitro group ($NO_2$), and a C1 to C5 fluoroalkyl group, provided that at least one of $R_7$ and $R_8$ is selected from a halogen, a cyano group (CN), a nitro group ($NO_2$), and a C1 to C5 fluoroalkyl group. Moreover, $R_7$ and $R_8$ are not simultaneously hydrogen.

Examples of the ethylene carbonate-based compound include difluoroethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive used to improve cycle life may be adjusted within an appropriate range.

The lithium salt is dissolved in an organic solvent, supplies lithium ions in a battery, operates a basic operation of the rechargeable lithium battery, and improves lithium ion transportation between positive and negative electrodes therein. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato) borate, LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, as needed. Examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

A rechargeable lithium battery can be classified into a lithium ion battery, a lithium ion polymer battery, and a lithium polymer battery depending on the kind of separator and electrolyte used therein. The rechargeable lithium battery may have a shape such as a cylinder, a prism, a coin, a pouch, and the like, or may be a bulk type, a thin film type, and the like, depending on the size.

FIG. 1 is a schematic view showing the representative structure of a rechargeable lithium battery according to one embodiment. As shown in FIG. 1, the rechargeable lithium battery 1 includes a battery case 5 including a positive electrode 3, a negative electrode 2, and a separator 4 interposed between the positive electrode 3 and the negative electrode 2, an electrolyte impregnated therein, and a sealing member 6 sealing the battery case 5.

The following examples illustrate this disclosure in more detail. These examples, however, are not in any sense to be interpreted as limiting the scope of this disclosure.

Comparative Example 1

Nickel sulfate, manganese sulfate, and cobalt sulfate were mixed at a mole ratio of 0.5:0.3:0.2 to prepare a metal aqueous solution with a 3M concentration (metal concentration). The metal aqueous solution of 1 L was put into a reactor including 4 L of distilled water. The reactor was maintained at 60° C. and an impeller speed was maintained at 700 rpm.

Then, a sodium hydroxide aqueous solution with a concentration of 23 wt % was added to the reactor to maintain the pH of the mixture at about 8. In addition, while an ammonia aqueous solution with a concentration of 28 wt % was supplied in the reactor for smooth reaction, nitrogen gases were blown therein at a speed of 500 mL/min to prevent oxidation. The reactant was allowed to stand in the reactor for 5 hours, and then, filtering and washing were performed followed by spray-drying using a spray-dryer.

The spray-drying process was performed by using a nozzle with compressed air and delivering the reactant at a speed of 200 mL per minute with a nozzle pressure of 0.5 MPa at 200° C. The spray-drying provided porous a bare precursor $(Ni_{0.5}Co_{0.2}Mn_{0.3})(OH)_2$, which is a transition element composite oxide. The precursor had an average particle diameter of 6.0 μm.

The precursor was dry-coated with $TiO_2$ having an average particle diameter of 21 nm using a spray-mixer. Herein, the $TiO_2$ was coated in an amount of 1 mol (1 mol %) based on 100 mols of the precursor.

The precursor coated with 1 mol % of $TiO_2$ was dry-mixed with $Li_4Ti_5O_{12}$ as a metal oxide including $Li_2Co_3$ and lithium for 20 minutes. Herein, Ti was regulated to be doped in an amount of 5 mol %. The mixture was heat-treated. The heat treatment was performed by increasing a temperature at a rate of 10° C./min up to 850° C., remaining at the same temperature for 10 hours, and naturally cooling down.

This process provided $LiNi_{0.5}Co_{0.2}Mn_{0.3}O_2$ in the form of secondary particles made of agglomerated primary particles with a size of 0.7 μm and including a 20 nm-thick $TiO_2$ layer on the surface. The product was used as a positive active material. The positive active material had an average particle diameter (D50) of 6.5 μm and a specific surface area of 0.30 $m^2/g$.

Example 1

A positive active material, $LiNi_{0.5}Co_{0.2}Mn_{0.3}O_2$ in the form of secondary particles made of agglomerated primary particles with a size of 0.5 μm and a 20 nm-thick $TiO_2$ layer on the surface, was prepared according to the same method as in Comparative Example 1, except for performing the spray-drying with a nozzle pressure of 0.6 MPa.

The positive active material had an average a particle diameter D50 of 6.5 μm and a specific surface area of 0.77 $m^2/g$.

Example 2

A positive active material, $LiNi_{0.5}Co_{0.2}Mn_{0.3}O_2$ in the form of secondary particles made of agglomerated primary particles with a size of 0.5 μm and a 20 nm-thick $TiO_2$ layer on the surface, was prepared according to the same method as in Comparative Example 1, except for performing the spray-drying with a nozzle pressure of 0.7 MPa. The positive active material had an average a particle diameter D50 of 6.5 μm and a specific surface area of 1.23 $m^2/g$.

Figure 2:
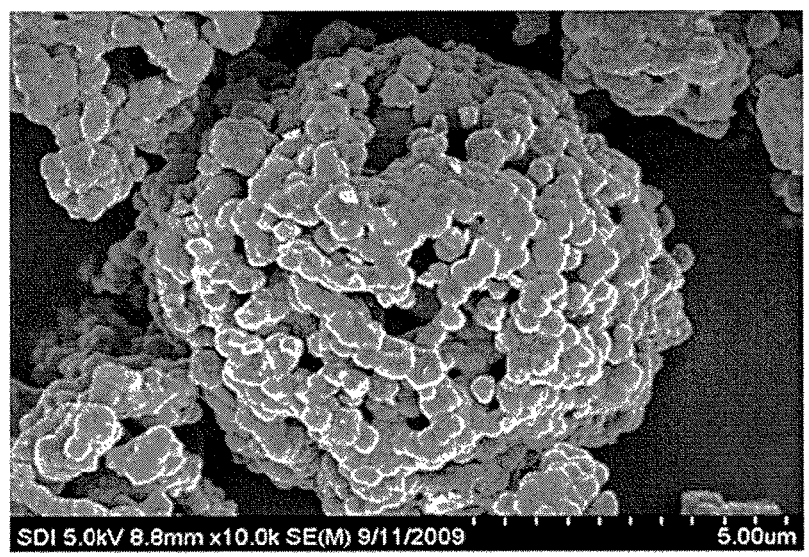
FIG. 2 illustrates an SEM photograph of the secondary particles according to Example 2.

FIG. 2 shows the SEM photograph of the secondary particles according to Example 2. As shown in FIG. 2, the secondary particles were agglomerated primary particles with a size of 0.5 μm. In addition, as shown in FIG. 2, a pore channel was formed between primary particles.

Example 3

A positive active material, $LiNi_{0.5}Co_{0.2}Mn_{0.3}O_2$ in the form of secondary particles made of agglomerated primary particles with a size of 0.5 μm and a 20 nm-thick $TiO_2$ layer on the surface, was prepared according to the same method as in Comparative Example 1, except for performing the spray-drying with a nozzle pressure of 0.8 MPa. The positive active material had an average particle diameter D50 of 6.5 μm and a specific surface area of 1.76 $m^2/g$.

Example 4

A positive active material, $LiNi_{0.5}Co_{0.2}Mn_{0.3}O_2$ in the form of secondary particles made of agglomerated primary particles with a size of 0.5 μm and a 20 nm-thick $TiO_2$ layer on the surface, was prepared according to the same method as in Comparative Example 1, except for performing the spray-drying with a nozzle pressure of 0.9 MPa. The positive active material had an average particle diameter D50 of 6.5 μm and a specific surface area of 2.0 $m^2/g$.

Comparative Example 2

Nickel sulfate, manganese sulfate, and cobalt sulfate were mixed at a mole ratio of 0.5:0.3:0.2 to prepare a 3M metal aqueous solution. The 3M metal aqueous solution was put into a reactor including 4 L of distilled water. The reactor was maintained at 60° C. and an impeller speed was maintained at 700 rpm.

Then, a sodium hydroxide aqueous solution with a concentration of 23 wt % was added to the reactor to maintain pH of the reactant at about 8. In addition, while an ammonia aqueous solution with a concentration of 28 wt % was supplied in the reactor for smooth reaction, nitrogen gases were blown in the reactor at a speed of 500 mL/min to prevent oxidation. The reactant was maintained for 12 hours in the reactor.

Next, the product was vacuum-dried for 12 hours in a 100° C. vacuum-dryer. This process provided a bare precursor $(Ni_{0.5}Co_{0.2}Mn_{0.3}, OH)_2$, a transition element composite oxide.

The precursor was used to prepare secondary particles of $LiNi_{0.5}Co_{0.2}Mn_{0.3}O_2$ agglomerated primary particles with a size of 0.7 nm according to the same method as Comparative Example 1. In addition, the $LiNi_{0.5}Co_{0.2}Mn_{0.3}O_2$ had a 20 nm-thick $TiO_2$ layer on the surface. The product was used as a positive active material. The positive active material had an average particle diameter D50 of 6.5 nm and a specific surface area of 0.35 $m^2/g$.

Fabrication of a Coin-Type Half-Cell 91 wt % of each positive active material according to Examples 1 to 5 and Comparative Example 1, 6 wt % of carbon black as a conductive material, and 3 wt % of a polyvinylidene fluoride binder were mixed in an N-methylpyrrolidone solvent, preparing a positive active material slurry.

The positive active material slurry was uniformly coated onto an Al foil, dried, and compressed, fabricating a positive electrode.

The positive electrode, a lithium metal counter electrode, and an electrolyte solution were used to fabricate coin-type half-cells according to a conventional process. Herein, the electrolyte solution that was used was 1 mol/L $LiPF_6$ dissolved in a mixed solvent of ethylene carbonate, ethylmethyl carbonate, and dimethyl carbonate at a volume ratio of 1:1:1.

The half-cells were charged and discharged one time at a charge and discharge cut-off voltage ranging from 4.3V-3.0V with a constant current of 0.1 C and the discharge capacity of each half-cell was measured. The discharge capacity results are provided in the following Table 1.

Fabrication of a 18650 Full Cell 85 wt % of each positive active material according to Examples 1 to 4 and Comparative Examples 1 and 2, 10 wt % of a graphite conductive material, and 5 wt % of a polyvinylidene fluoride binder were dissolved in an N-methylpyrrolidone solvent, preparing a positive active material slurry.

The positive active material slurry was uniformly coated onto an Al foil, dried, and compressed, fabricating a positive electrode.

Next, 96 wt % of a natural graphite negative active material and 4 wt % of a polyvinylidene fluoride binder were mixed in an N-methylpyrrolidone solvent, preparing negative active material slurry.

The negative active material slurry was uniformly coated onto a Cu foil, dried, and compressed, fabricating a negative electrode.

The positive and negative electrodes and an electrolyte solution were used to fabricate 18650 full cells according to a common process. Herein, the electrolyte solution that was used was 1 mol/L $LiPF_6$ dissolved in a mixed solvent of ethylene carbonate, ethylmethyl carbonate, and dimethyl carbonate at a volume ratio of 1:1:1.

The full cells were charged and discharged one time at a charge and discharge cut-off voltage ranging from 4.3V-3.0V with a constant current of 2.0 C under a temperature condition of 25° C. and −30° C. and measured regarding DC-IR (direct current-internal resistance). The discharge process was performed for 10 seconds and provided as 10 sec in the following Table 1.

As shown in Table 1, the cells including the positive active materials with a specific surface area within a range of 0.40 $m^2/g$ to 2.0 $m^2/g$ when the positive active material have an average a particle diameter D50 of 6.5 µm according to Examples 1 to 4 had excellent capacity characteristics and low resistance, and thus, may be usefully applied to a high power battery. However, the positive active material of Example 4 was prepared by performing spray-drying under a pressure of 0.9 MPa and was somewhat broken during the compressing process, and thus, processing properties were deteriorated when a positive electrode was fabricated.

On the other hand, a cell including the positive active material with an average a particle diameter D50 of 6.5 µm and a specific surface area of 0.30 $m^2/g$, according to Comparative Example 1, had a lower capacity but a larger resistance than a cell including the positive active materials according to Examples 1 to 4. In addition, the cell including the positive active material with an average a particle diameter D50 of 6.5 µm and a specific surface area of 0.35 $m^2/g$, according to Comparative Example 2, had a lower capacity but a larger resistance than a cell including the positive active materials according to Examples 1 to 4.

By way of summation and review, composite metal oxides such as $LiCoO_2$, $LiMn_2O_4$, $LiNiO_2$, $LiNi_{1-x}Co_xO_2$ (0<x<1), $LiMnO_2$, and the like, have been considered as positive active materials of a rechargeable lithium battery. Cobalt-based materials such as $LiCoO_2$ may provide good electrical conductivity, a high cell voltage, and excellent electrode characteristics, but may be expensive. Manganese-based positive active materials such as $LiMn_2O_4$ and $LiMnO_2$ may be easy to synthesize, may be inexpensive, and may be environmentally friendly, but they may have a relatively low capacity. Nickel-based materials such as $LiNiO_2$ may be inexpensive and may have the highest discharge capacity among the above positive active materials, and thus have been actively researched as useful active materials for a high power battery.

As described herein, a positive active material for a rechargeable lithium battery based on a nickel-based compound may be manufactured to have excellent capacity and power characteristic.

Example embodiments have been disclosed herein, and although specific terms are employed, they are used and are to be interpreted in a generic and descriptive sense only and not for purpose of limitation. Accordingly, it will be understood by those of skill in the art that various changes in form

TABLE 1

| | Average particle diameter (D50, µm) | Specific surface area ($m^2/g$) | Half-cell Capacity (mAh/g) | 18650 full-cell (10 sec) | | Notes |
| --- | --- | --- | --- | --- | --- | --- |
| | | | | 25° C. DC-IR(Ω) | −30° C. DC-IR(Ω) | |
| Comparative Example 2 | 6.5 | 0.35 | 168 | 1.72 | 90 | |
| Comparative Example 1 | 6.5 | 0.30 | 173 | 1.65 | 82 | |
| Example 1 | 6.5 | 0.77 | 181 | 1.42 | 69 | |
| Example 2 | 6.5 | 1.23 | 193 | 1.21 | 54 | |
| Example 3 | 6.5 | 1.76 | 208 | 1.13 | 42 | |
| Example 4 | 6.5 | 2.0 | 211 | 1.35 | 53 | Cracks of active materials during compressing |

What is claimed is:

1. A positive active material for a rechargeable lithium battery, the positive active material comprising:
   secondary particles including agglomerated primary particles of a nickel-based compound, the primary particles having an average particle diameter ranging from 0.1 μm to 2.0 μm,
   wherein the positive active material has a specific surface area that is 0.77 m²/g or greater and less than 2.0 m²/g and an average particle diameter ranging from 5.5 μm to 7.5 μm;
   wherein a metal oxide layer is on at least one surface of the primary particles and the secondary particles, and
   wherein the nickel-based compound is represented by the following Chemical Formula 1 or 2:

$$Li_xMO_{2-z}L_z$$ [Chemical Formula 1]

wherein, M is $M'_{1-k}A_k$ (M' is $N_{1-d-e}Mn_dCo_e$, 0.3≤d+e≤0.7, 0.1≤e≤0.4, A is a dopant, and 0≤k<0.05);
   L is F, S, P, or a combination thereof,
   0.95≤x≤1.05, and
   0≤z≤2, $$Li_xNi_yT_{1-y}O_{2-z}L_z$$ [Chemical Formula 2]

wherein, T is Al, Co, Mn, Cr, Fe, Mg, Sr, a rare earth element, or a combination thereof,
   L is F, S, P, or a combination thereof,
   0.95≤x≤1.05,
   0.3≤y≤0.7, and
   0≤z≤2.

2. The positive active material as claimed in claim 1, wherein a pore channel is between the primary particles.

3. The positive active material as claimed in claim 1, wherein the metal oxide layer includes a metal that is Mg, Al, Co, K, Na, Ca, Si, Ti, V, Sn, Ge, Ga, B, As, Zr, or a mixture thereof.

4. The positive active material as claimed in claim 1, wherein the metal oxide layer has a thickness ranging from 1 nm to 50 nm.

5. A method of preparing the positive active material as claimed in claim 1, the method comprising:
   preparing a transition element composite precursor by agitating and reacting a metal-mixed liquid including a nickel compound, a cobalt compound, and a manganese compound;
   spray-drying the transition element composite precursor under a pressure greater than 0.5 MPa and less than or equal to 1.0 MPa to prepare a porous transition element composite precursor;
   mixing the porous transition element composite precursor with a lithium salt; and
   heat-treating the mixture.

6. The method as claimed in claim 5, further comprising coating the transition element composite precursor with a metal oxide to form a metal oxide layer thereon.

7. The method as claimed in claim 5, wherein the coating of the transition element composite precursor with a metal oxide to form the metal oxide layer thereon is carried out after the heat treatment.

8. The method as claimed in claim 5, wherein the spray-drying process is performed at a temperature ranging from 150° C. to 250° C.

9. The method as claimed in claim 5, wherein the heat treatment is performed at a temperature ranging from 750° C. to 990° C.

10. A rechargeable lithium battery, comprising
    a positive electrode comprising the positive active material as claimed in claim 1;
    a negative electrode comprising a negative active material; and
    an electrolyte.

11. The positive active material as claimed in claim 1, wherein the primary particles have an average particle diameter ranging from 0.1 μm to 1.0 μm.

12. The positive active material as claimed in claim 1, wherein the primary particles have an average particle diameter ranging from 0.1 μm to 0.5 μm.

13. The positive active material as claimed in claim 1, wherein the nickel-based compound is represented by Chemical Formula 2.

* * * * *